(12) United States Patent
Ryan

(10) Patent No.: US 6,837,419 B2
(45) Date of Patent: Jan. 4, 2005

(54) RECUPERATOR FOR USE WITH TURBINE/TURBO-ALTERNATOR

(75) Inventor: William R. Ryan, Jupiter, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 56 days.

(21) Appl. No.: 09/934,640

(22) Filed: Aug. 22, 2001

(65) Prior Publication Data

US 2001/0052231 A1 Dec. 20, 2001

Related U.S. Application Data

(62) Division of application No. 09/571,195, filed on May 16, 2000.

(51) Int. Cl.$^7$ .............................................. B23K 31/02
(52) U.S. Cl. ...................... 228/183; 228/136; 228/141.1
(58) Field of Search ................................ 228/135–137, 228/183, 184, 245, 246, 41; 219/60.2

(56) References Cited

U.S. PATENT DOCUMENTS

| | | | |
|---|---|---|---|
| 813,918 A | 2/1906 | Schmitz | |
| 1,393,917 A | 10/1921 | Snell | |
| 1,673,992 A | 6/1928 | Owen | |
| 1,934,174 A | 11/1933 | Dyckerhoff | 154/28 |
| 2,354,698 A | 8/1944 | Norris | 60/41 |
| 2,362,571 A | 11/1944 | McCollum | 126/116 |
| 2,386,746 A | 10/1945 | Hess | 158/96 |
| 2,537,276 A | 1/1951 | McMahon et al. | 257/245 |
| 2,584,982 A | 2/1952 | Burke | 189/62 |
| 2,792,200 A | 5/1957 | Huggins et al. | 257/246 |
| 3,043,103 A | 7/1962 | Dent et al. | 60/35.6 |
| 3,151,672 A | 10/1964 | Edmund | 165/143 |
| 3,197,975 A | 8/1965 | Boling | 62/498 |
| 3,200,948 A | 8/1965 | Kasten | 210/184 |
| 3,255,818 A | 6/1966 | Beam, Jr. et al. | 165/166 |
| 3,322,189 A | 5/1967 | Topouzian | 165/8 |
| 3,507,115 A | 4/1970 | Wisoka | 60/39.51 |
| 3,602,296 A * | 8/1971 | Heyn et al. | 165/81 |
| 3,777,502 A | 12/1973 | Michie, III et al. | 62/55 |
| 3,782,457 A * | 1/1974 | Troy | 165/165 |
| 3,818,984 A | 6/1974 | Nakamura et al. | 165/166 |
| 4,036,293 A * | 7/1977 | Tank et al. | 165/134.1 |
| 4,059,882 A | 11/1977 | Wunder | 29/157.3 A |
| 4,066,861 A * | 1/1978 | Broodman | 219/61 |
| 4,098,330 A | 7/1978 | Flower et al. | 165/166 |
| 4,116,271 A | 9/1978 | De Lepeleire | 165/166 |
| 4,177,861 A | 12/1979 | Costello et al. | 165/101 |
| 4,210,200 A | 7/1980 | Vary | 165/98 |
| 4,233,812 A | 11/1980 | Leistritz | 60/320 |
| 4,263,967 A | 4/1981 | McNab et al. | 165/166 |
| 4,297,775 A | 11/1981 | Butt et al. | 29/157.3 R |
| 4,301,863 A | 11/1981 | Bizzarro | 165/166 |
| 4,303,123 A | 12/1981 | Skoog | 165/166 |
| 4,305,457 A | 12/1981 | Cozzolino | 165/154 |
| 4,307,568 A | 12/1981 | Huller et al. | 60/39.51 R |
| 4,345,644 A | 8/1982 | Dankowski | 165/154 |

(List continued on next page.)

FOREIGN PATENT DOCUMENTS

| | | | |
|---|---|---|---|
| FR | 2 566 306 A1 * | 12/1985 | |
| JP | 54-69537 A * | 6/1979 | |
| JP | 54-069537 A * | 6/1979 | |
| JP | 56-71595 A * | 6/1981 | |
| JP | 56-071595 A * | 6/1981 | |

Primary Examiner—Kiley S. Stoner
Assistant Examiner—Kevin McHenry
(74) Attorney, Agent, or Firm—Webb Ziesenheim Logsdon Orkin & Hanson, P.C.

(57) ABSTRACT

An annular recuperator for use with an annular combustor. The annular recuperator includes a frame and an enclosure provided about its frame that defines a recuperator chamber. A plurality of involute shaped sealed and open recuperators are received in the recuperator chamber.

5 Claims, 11 Drawing Sheets

U.S. PATENT DOCUMENTS

| | | | |
|---|---|---|---|
| 4,347,896 A | | 9/1982 | Rosman et al. ............. 165/166 |
| 4,369,911 A | * | 1/1983 | Blumenberg ............. 228/173.4 |
| 4,377,024 A | * | 3/1983 | Saperstein ............... 29/890.04 |
| 4,382,359 A | | 5/1983 | Sampayo ................ 60/39.511 |
| 4,423,890 A | * | 1/1984 | Hackett et al. ............. 285/189 |
| 4,433,545 A | | 2/1984 | Chang ......................... 60/678 |
| 4,459,466 A | | 7/1984 | Nakagawa et al. ......... 219/367 |
| 4,470,454 A | | 9/1984 | Laughlin et al. ............ 165/166 |
| 4,474,000 A | | 10/1984 | Benson et al. ........... 60/39.115 |
| 4,475,589 A | | 10/1984 | Mizuno et al. ............. 165/166 |
| 4,501,321 A | | 2/1985 | Real et al. .................. 165/153 |
| 4,506,502 A | | 3/1985 | Shapiro ..................... 60/39.43 |
| 4,509,588 A | | 4/1985 | Parham ................... 165/80 R |
| 4,527,622 A | | 7/1985 | Weber ........................ 165/166 |
| 4,550,872 A | * | 11/1985 | Ohnishi ......................... 228/48 |
| 4,579,171 A | * | 4/1986 | Stafford et al. ............. 165/115 |
| 4,579,172 A | | 4/1986 | Carlsson ..................... 165/167 |
| 4,615,477 A | * | 10/1986 | Spada et al. ................. 228/119 |
| 4,657,074 A | | 4/1987 | Tomita et al. .............. 165/179 |
| 4,660,377 A | | 4/1987 | Wadsworth ............. 60/39.511 |
| 4,688,631 A | | 8/1987 | Peze et al. .................. 165/166 |
| 4,697,633 A | | 10/1987 | Darragh et al. ............... 165/51 |
| 4,744,505 A | * | 5/1988 | Calleson ................ 29/744.044 |
| 4,778,002 A | | 10/1988 | Allgauer et al. ............ 165/141 |
| 4,805,693 A | | 2/1989 | Flessate ...................... 165/153 |
| 4,821,797 A | | 4/1989 | Allgauer et al. ............ 165/141 |
| 4,878,536 A | | 11/1989 | Stenlund .................... 165/119 |
| 4,889,181 A | | 12/1989 | Meijer ......................... 165/78 |
| 4,951,460 A | | 8/1990 | Prochaska et al. ....... 60/39.161 |
| 4,966,231 A | | 10/1990 | Belcher et al. ............. 165/166 |
| 4,974,413 A | | 12/1990 | Szego ..................... 60/39.511 |
| 4,993,223 A | | 2/1991 | Kretzinger .............. 60/39.511 |
| 4,996,029 A | | 2/1991 | Martin et al. ............... 422/188 |
| 5,004,044 A | | 4/1991 | Horgan et al. .............. 165/145 |
| 5,036,913 A | * | 8/1991 | Murphy et al. ............. 165/173 |
| 5,050,668 A | | 9/1991 | Peterson et al. ............... 165/81 |
| 5,060,721 A | * | 10/1991 | Darragh ...................... 165/165 |
| 5,065,816 A | | 11/1991 | Darragh ...................... 165/125 |
| 5,079,911 A | | 1/1992 | Kumakura ............... 60/39.511 |
| 5,081,834 A | | 1/1992 | Darragh ................... 60/39.511 |
| 5,082,050 A | | 1/1992 | Darragh ...................... 60/39.511 |
| 5,085,038 A | | 2/1992 | Todman et al. ............ 60/39.37 |
| 5,105,617 A | | 4/1992 | Malohn ................... 60/39.511 |
| 5,119,624 A | | 6/1992 | McKenna ................ 60/39.511 |
| 5,148,670 A | | 9/1992 | Birch et al. .............. 60/39.142 |
| 5,212,942 A | | 5/1993 | Malohn ..................... 60/39.07 |
| 5,215,144 A | | 6/1993 | May et al. ................... 165/154 |
| 5,275,236 A | * | 1/1994 | Le Gauyer .................. 165/178 |
| 5,287,918 A | | 2/1994 | Banks et al. ................ 165/166 |
| 5,292,056 A | * | 3/1994 | Borchert et al. ............ 228/183 |
| 5,303,771 A | | 4/1994 | Des Champs ............... 165/165 |
| 5,368,095 A | | 11/1994 | Kadambi et al. ............. 165/83 |
| 5,388,398 A | | 2/1995 | Kadambi et al. ........ 60/39.511 |
| 5,407,004 A | * | 4/1995 | DeRisi et al. ............... 165/153 |
| 5,435,377 A | | 7/1995 | Kratochvil .................... 165/54 |
| 5,468,449 A | | 11/1995 | Sjogren et al. ................ 422/46 |
| 5,474,639 A | | 12/1995 | Alander et al. .......... 156/309.6 |
| 5,497,615 A | | 3/1996 | Noe et al. ................. 60/39.511 |
| 5,542,467 A | | 8/1996 | Carpentier .................... 165/70 |
| 5,555,933 A | | 9/1996 | Darragh et al. ............. 165/166 |
| 5,564,496 A | | 10/1996 | Blum et al. ............... 165/134.1 |
| 5,586,430 A | | 12/1996 | Stopa ...................... 60/39.511 |
| 5,649,589 A | | 7/1997 | Carpentier .................... 165/70 |
| 5,685,156 A | | 11/1997 | Willis et al. ................... 60/723 |
| 5,697,433 A | | 12/1997 | Kato .......................... 165/170 |
| 5,699,856 A | | 12/1997 | Merle ......................... 165/166 |
| 5,735,342 A | | 4/1998 | Nitta .......................... 165/122 |

* cited by examiner

RECUPERATOR FOR USE WITH TURBINE/TURBO-ALTERNATOR

CROSS-REFERENCE TO RELATED APPLICATIONS

The present application is a divisional of U.S. patent application Ser. No. 09/571,195 filed May 16, 2000 entitled "Recuperator for Use With Turbine/Turbo-Alternator" herein incorporated by reference in its entirety.

BACKGROUND OF THE INVENTION

1. Field of the Invention

The present invention relates to heat exchangers and, more particularly, to recuperators for use with turbines and turbo-alternators.

2. Description of the Prior Art

Many gas turbine engines use a heat exchanger or recuperator to increase the operational efficiency of the engine by extracting heat from the exhaust gas of the engine and preheating the intake air before it is passed to a combustor section of the engine. Typically, a recuperator for a gas turbine engine is annular-shaped in cross section and positioned around the engine. Such "annular" recuperators generally include a core which is commonly constructed of a plurality of relatively thin, flat metal sheets having an angled or corrugated spacer fixedly attached therebetween. The sheets are joined into cells and sealed at opposite sides, forming passages between the sheets. The cells are stacked or rolled and form alternating cold air intake cells and hot air exhaust cells. The hot exhaust air from the engine heats the sheets and the spacers; and the cold air cells are heated by conduction from the sheets and the spacers.

One annular heat exchanger is known from U.S. Pat. No. 5,081,834 to Darragh. The heat exchanger disclosed by the Darragh patent is configured to resist the internal forces and pressures and the thermal stresses inherent from the cyclic operation of a gas turbine engine. The core of the heat exchanger disclosed by the Darragh patent has a plurality of heat recipient passages which have a uniform cross-sectional area throughout the entire length of the passages. In addition, the core has a plurality of heat donor passages which have a uniform cross-sectional area throughout the length of the passages. The heat recipient passages contain a heat recipient fluid during operation and the heat donor passages contain a heat donor fluid during operation. The core includes a plurality of stacked primary cells each defining one of the passages (heat recipient passages or heat donor passages) therein. The cells are secured together forming a generally annular shaped core in cross section. Each of the plurality of cells has an involute curve shape and includes at least a pair of primary surface pleated sheets.

A major disadvantage with heat exchangers such as that disclosed by the Darragh patent is that the heat recipient passages and the heat donor passages are defined by a plurality of metal sheets that extend between an inner diameter of the heat exchanger and an outer diameter of the heat exchanger. Each of these sheets is a potential leak path between the heat donor fluid and the heat recipient fluid, which will degrade the efficiency of the heat exchanger and the power output of the engine.

Accordingly, an object of the present invention is to provide a recuperator for use with a turbine or a turbo-alternator that reduces the possibility of leakage between a heat donor fluid and a heat recipient fluid. It is a further object of the present invention to provide a relatively inexpensive recuperation for use with a turbine or a turbo-alternator.

SUMMARY OF THE INVENTION

The above objects are accomplished with a cylindrical or annular shaped recuperator made in accordance with the present invention.

The present invention is a fluid recuperator that includes a frame, an enclosure provided about the frame defining a recuperator chamber, a first fluid inlet in fluid communication with the recuperator chamber, a first fluid outlet in fluid communication with the recuperator chamber, a plurality of spaced sealed recuperator units received within the recuperator chamber, each of the recuperating units having a body with an outer surface and an inner surface that defines a second fluid flow chamber, a second fluid inlet in fluid communication with the plurality of sealed recuperator units and a second fluid outlet in fluid communication with said plurality of sealed recuperator units. The recuperator is adapted to have a first fluid flow through the first gas inlet, the recuperator chamber across the sealed recuperator units outer surface and through the first fluid outlet, respectively, while a second fluid passes through the second fluid inlet, through the second fluid flow chambers, contacting inner surfaces of the sealed recuperator units and through said second fluid outlet in a manner that the first fluid and the second fluid do not mix while passing through the recuperator chamber and heat transfer takes place between the fluids through the bodies of the sealed recuperator units.

The present invention is also a method for manufacturing a sealed recuperator unit, that includes the steps of:

(a) providing a first section having an embossment;

(b) providing a second section;

(c) placing a corrugated member in the embossment;

(d) placing the second section over the first section; and (e) welding said first section to said second section thereby forming a sealed recuperator unit.

The present invention is also a method for cleaning the above described recuperator, that includes the steps of:

(a) removing at least one of said open recuperator units which is fouled; and (b) replacing the removed open recuperator unit with a cleaned recuperator unit.

The present invention is also a method for forming a joint, that includes the steps of:

(a) providing a first metallic member having a first thickness and having a lip;

(b) providing a second metallic member having a slot for receipt of the lip, the second metallic member having a second thickness, the second thickness is greater than the first thickness;

(c) placing the lip within the slot so that a tip of the lip extends beyond the slot;

(d) heating the tip until the tip melts;

(e) heating the second metallic member adjacent the tip so that the melted tip causes the first metallic member to weld to the second metallic member about the lip; and (f) permitting the first metallic member and the second metallic member to cool, thereby forming a welded joint about the lip.

Further details and advantages of the present invention will become apparent with reference to the following detailed description, in conjunction with the drawings.

DETAILED DESCRIPTION OF THE PREFERRED EMBODIMENTS

Figure 1:
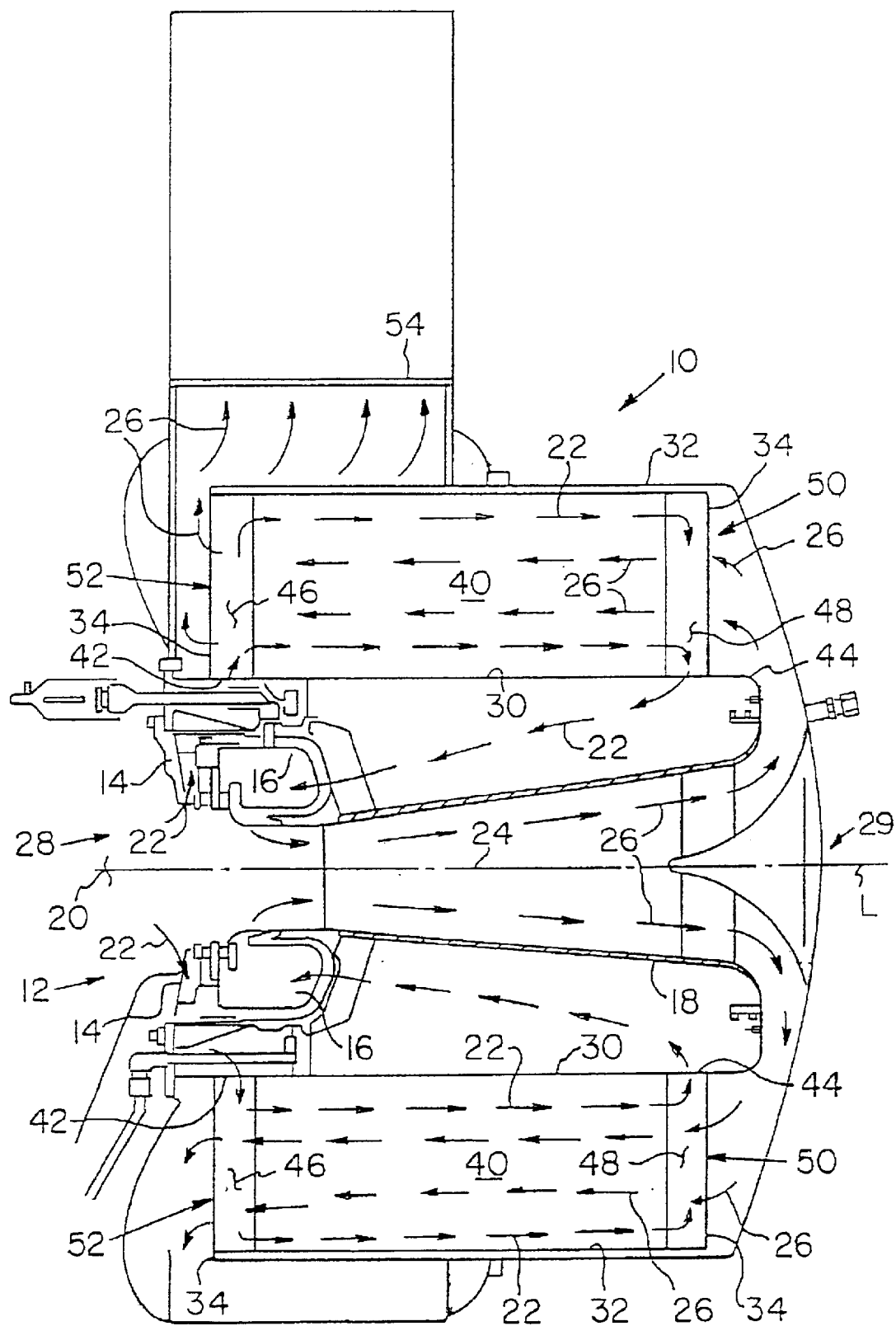
FIG. 1 is a sectional view of a recuperator and turbine engine.
Figure 2:
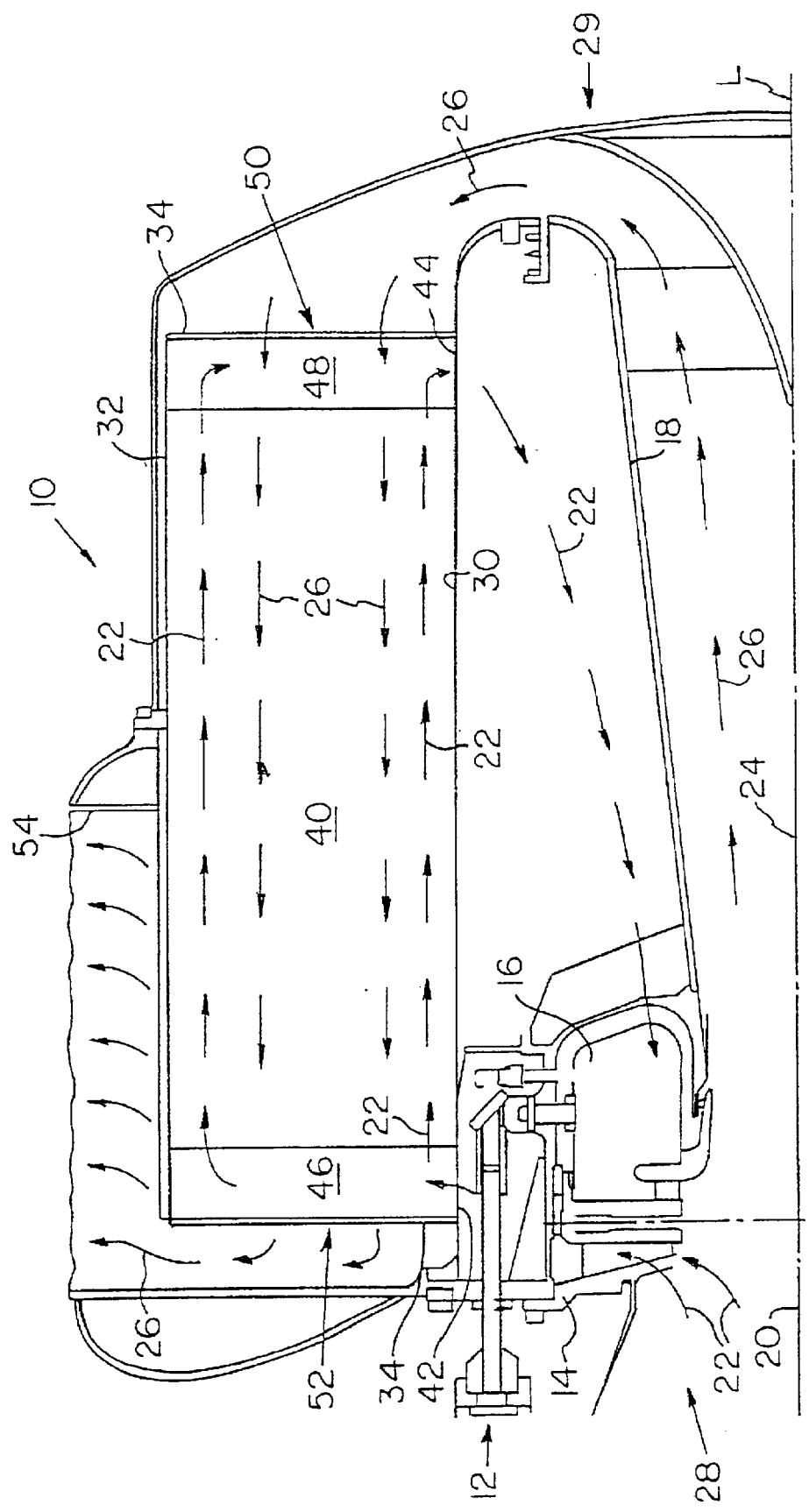
FIG. 2 is a sectional view of an upper portion of the recuperator and turbine engine shown in FIG. 1.

FIGS. 1 and 2 show a heat exchanger or a recuperator 10 positioned around a gas turbine engine 12. The engine 12 has been configured to interface with the annular recuperator 10 and is a typical gas turbine engine that includes a compressor section 14 connected to and in fluid communication with the recuperator 10. The recuperator 10 is further connected to and in fluid communication with a combustor 16. The combustor 16 is further connected to and in fluid communication with a power turbine 18. The engine 12 defines an air intake 20 for a heat recipient fluid, such as cold outside air, which is designated by arrows 22 in the figures. The power turbine 18 defines a turbine exhaust 24 positioned adjacent the combustor 16. A heat donor fluid, such as combusted hot air, is designated by arrows 26 in the figures and is shown exiting from the turbine 18 in FIGS. 1 and 2. The recuperator 10 and the engine 12 are spaced concentrically from a central axis designated by reference character L. The recuperator 10 and the engine 12 are symmetric about the central axis L. The cold air 22 has a lower temperature than the hot air 26. The engine 12 generally further includes a first axial end 28 and a second axial end 29.

Figure 3:
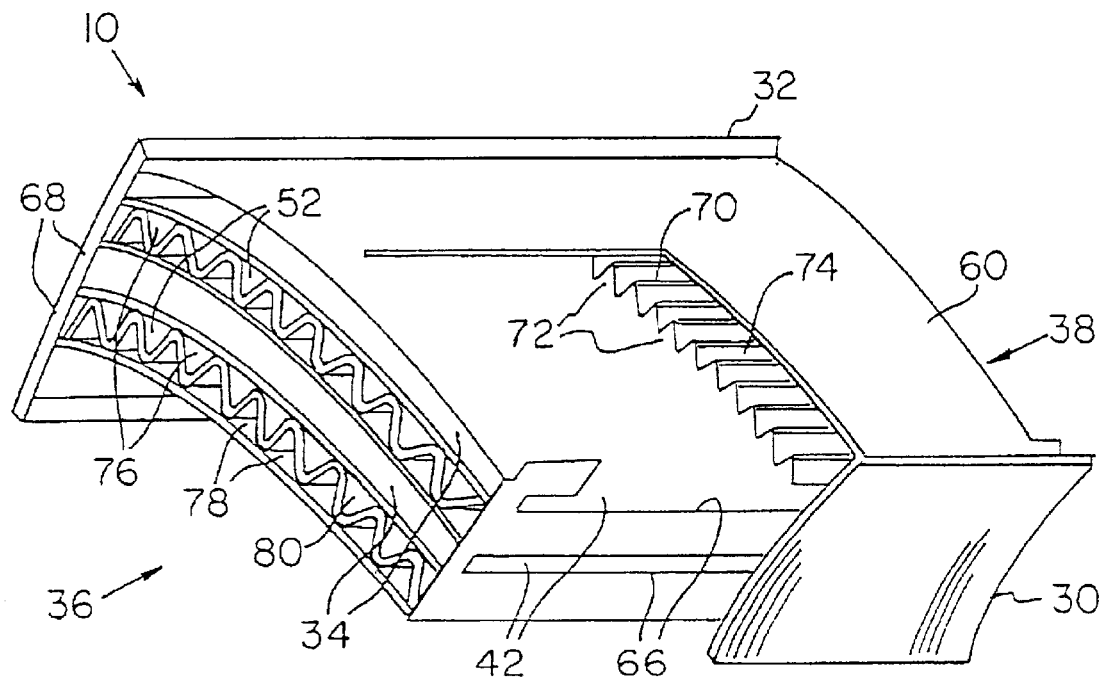
FIG. 3 is a perspective view, partially cut away, of the recuperator shown in FIG. 1.
Figure 4:
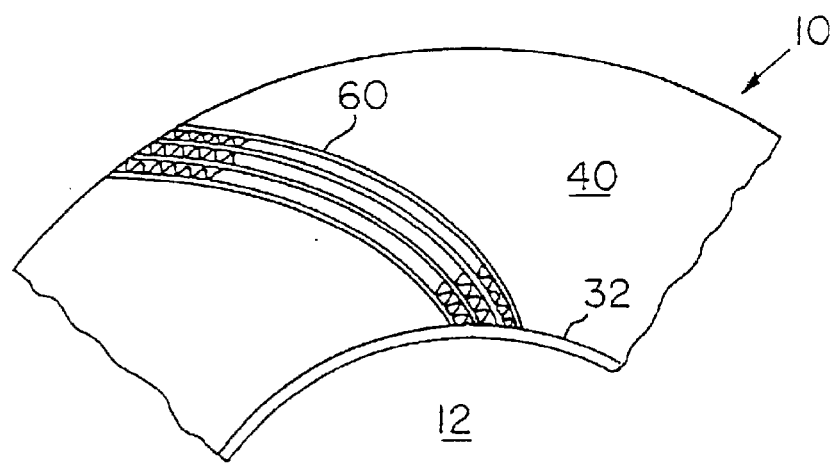
FIG. 4 is an end view of the recuperator shown in FIG. 1.

Referring now to FIGS. 1–3, the recuperator 10 is generally defined by an inner shell 30, an outer shell 32 positioned concentrically around the inner shell 30 and a plurality of end caps 34 attached to a first end 36 of the inner and outer shells 30, 32 and to a second end 38 of the inner and outer shells 30, 32. The inner shell 30 and the outer shell 32 generally define an annular shaped recuperator core 40 therebetween, wherein heat transfer takes place between the cold air 22 and the hot air 26.

The inner shell 30 defines a plurality of cold air inlets or first air inlets 42 at the first end 36 of the inner shell 30. In addition, the inner shell 30 defines a plurality of hot air outlets or first air outlets 44 at the second end 38 of the inner shell 30. As shown in FIG. 3, the first air inlets 42 are spaced at regular intervals around a circumference of the inner shell 30. A similar arrangement for the first air outlets 44 is provided at the second end 38 of the inner shell 30 (not shown). The first air inlets 42 are each in fluid communication with an air inlet manifold 46 located within the recuperator core 40. Similarly, each of the first air outlets 44 is in fluid communication with an outlet air manifold 48 also located within the recuperator core 40. The air inlet manifold 46 is positioned adjacent the first end 36 of the inner and outer shells 30, 32. Likewise, the air outlet manifold 48 is positioned adjacent the second end 38 of the inner and outer shells 30, 32.

The second axial end 29 of the recuperator 10 includes a plurality of recuperator inlets 50 that are in fluid communication with the turbine exhaust 24. The recuperator inlets 50 are adapted to channel the hot air 26 into the recuperator core 40. Similarly, the first axial end 28 of the recuperator 10 includes a plurality of recuperator outlets 52 that are in fluid communication with a turbine engine exhaust 54. The recuperator outlets 52 are adapted to channel the hot air 26 from the recuperator core 40 to the engine exhaust 54 where the hot air 26, now cooled, exits the recuperator 10. As shown in FIGS. 1 and 2, the recuperator 10 generally provides for biaxial flow or counterflow in the recuperation core 40, with the cold air 22 and the hot air 26 flowing in opposite directions in the recuperator core 40.

Figure 5:
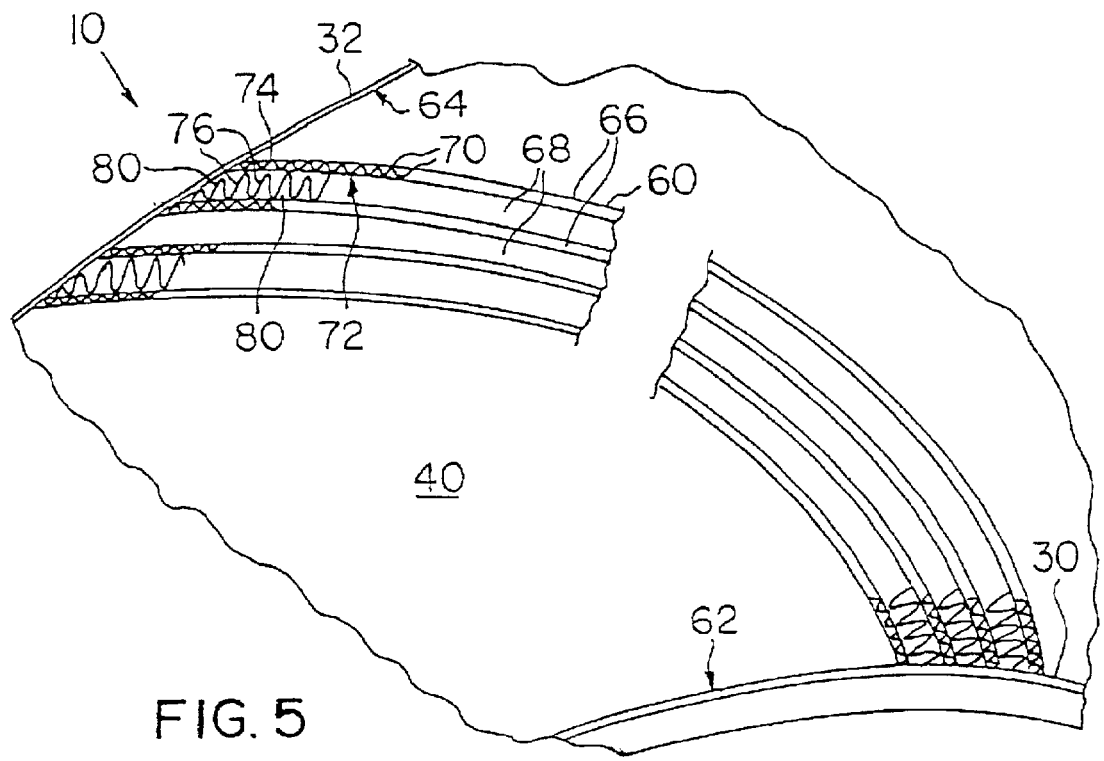
FIG. 5 is a partial end view of the recuperator shown in FIG. 4.
Figure 6:
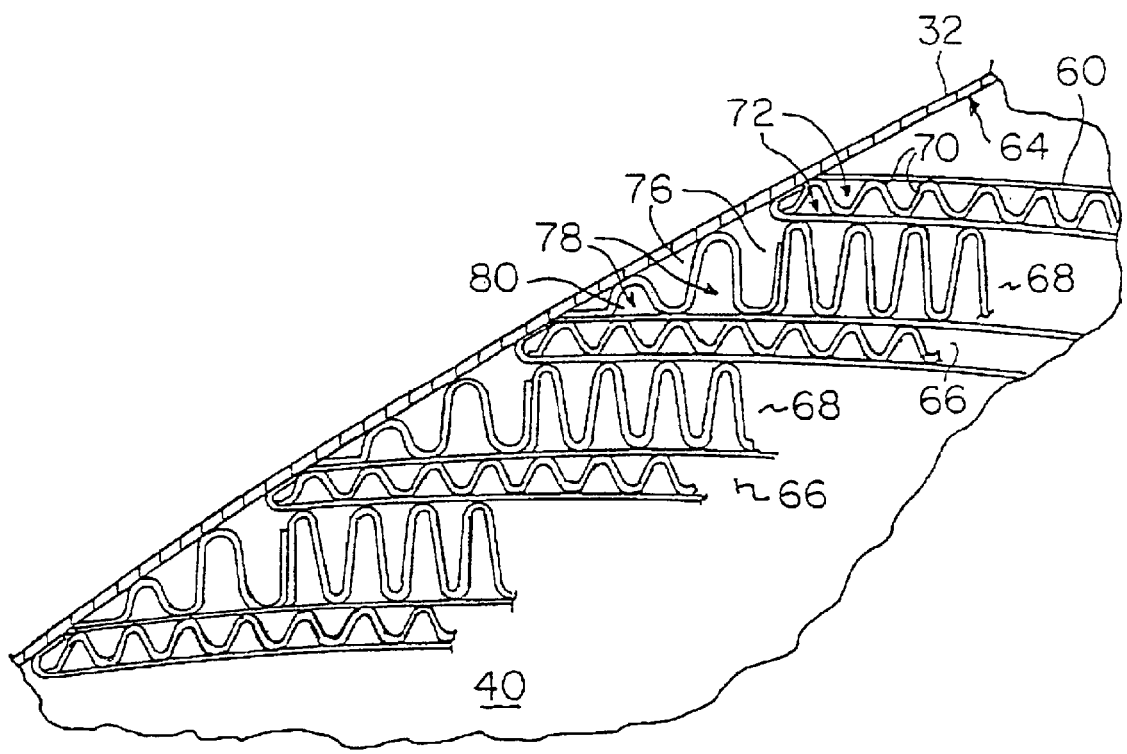
FIG. 6 is a partial end view of the recuperator shown in FIG. 4, immediately adjacent an outer shell of the recuperator.
Figure 7:
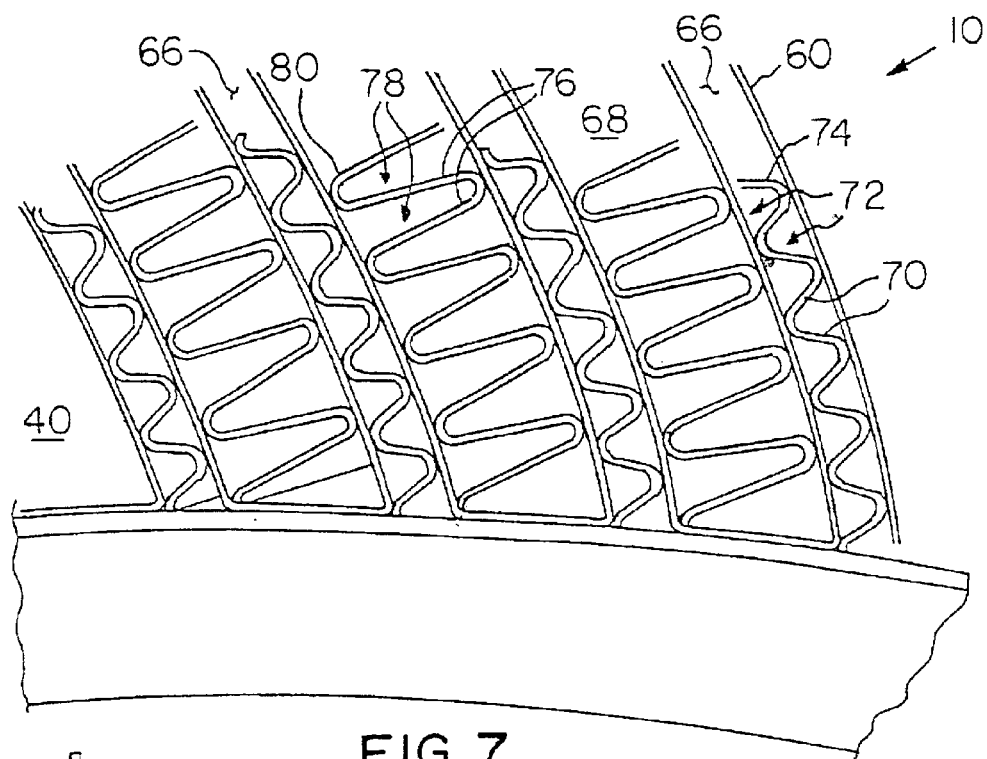
FIG. 7 is a partial end view of the recuperator shown in FIG. 4, immediately adjacent an inner shell of the recuperator.

Referring to FIGS. 3–7, the recuperator 10 further includes a continuous serpentine plate 60 connecting the inner and outer shells 30, 32 and positioned entirely within the recuperator core 40. The serpentine plate 60 preferably fills 360° around the circumference of the inner shell 30. However, in FIGS. 5–7 the serpentine plate 60 is shown filling only a portion of the recuperator core 40. The serpentine plate 60 defines an involute contour between the inner and outer shells 30, 32. The serpentine plate 60, as best shown in FIGS. 5–7, continuously extends back and forth between an outer surface 62 of the inner shell 30 and an inner surface 64 of the outer shell 32. The serpentine plate 60 is preferably continuously folded back and forth between the inner and outer shells 30, 32 around an entire circumference of the inner shell 30 and defines an involute contour between the inner and outer shells 30, 32. The serpentine plate 60 further defines a plurality of alternating cold air chambers 66 and hot air chambers 68. Each of the cold air chambers 66 and the hot air chambers 68 has an involute shaped cross section due to the involute contour defined by the serpentine plate 60. The cold air chambers 66 each extend the distance between the air inlet manifold 46 and the air outlet manifold 48 (shown in FIGS. 1 and 2) and are each in fluid communication with the air inlet manifold 46 and the air outlet manifold 48. The end caps 34 are attached to the inner and outer shells 30, 32 so as to define an end wall of each of the cold air chambers 66, as shown in FIG. 3. The cold air chambers 66 are thereby prevented from being in fluid communication with the recuperator inlets 50 and the recuperator outlets 52. The end caps 34 isolate the high pressure from the low pressure at the first and second axial ends 28, 29 of the recuperator 10.

The hot air chambers 68 extend the length of the recuperator core 40 from the first end 36 to the second end 38 of the inner and outer shells 30, 32. The hot air chambers 68 are each in fluid communication with one of the recuperator inlets 50 and one of the recuperator outlets 52 (each shown in FIGS. 1 and 2). The cold air chambers 66 and the hot air chambers 68 thus preferably extend longitudinally in the recuperator core 40 providing the means for the biaxial flow or counterflow in the recuperator core 40.

The cold air chambers 66 each further include a plurality of cold air fins 70 positioned within each of the cold air chambers 66. The cold air fins 70 extend transversely between the serpentine plate 60 defining each of the cold air chambers 66. The cold air fins 70 are corrugated in the cold air chambers 66, as is known in the art. The cold air fins 70 further divide each of the cold air chambers 66 into a plurality of longitudinally extending cold air tubes 72. The cold air fins 70 are formed by a continuous sheet 74 that extends between the inner surface 64 of the outer shell 32 and the outer surface 62 of the inner shell 30. In a similar manner, the hot air chambers 68 each further include a plurality of hot air fins 76 positioned within each of the hot air chambers 68. The hot air fins 76 extend transversely between the serpentine plate 60 defining each of the hot air chambers 68. The hot air fins 76 are corrugated in the hot air chambers 68, as is known in the art. The hot air fins 76 further divide each of the hot air chambers 68 into a plurality of longitudinally extending hot air tubes 78. The hot air fins 76 are formed by a continuous sheet 80 that extends between the inner surface 64 of the outer shell 32 and the outer surface 62 of the inner shell 30. All contact points between the cold air fins 72, the hot air fins 76, the serpentine plate 60 and the inner and outer shells 30, 32 are preferably brazed or welded. Preferably, the inner and outer shells 30, 32, the end caps 34, the serpentine plate 60 and the continuous sheets 74, 80 forming the respective cold and hot air fins 72, 76 are each preferably 0.005 of an inch in thickness. As stated, the serpentine plate 60 preferably fills 360° around the circumference of the inner shell 30 and, in addition, only requires one joint between the inner and outer shells 30, 32. In FIGS. 5–7, as stated previously, the serpentine plate 60 is shown filling only a portion of the recuperator core 40.

Figure 8:
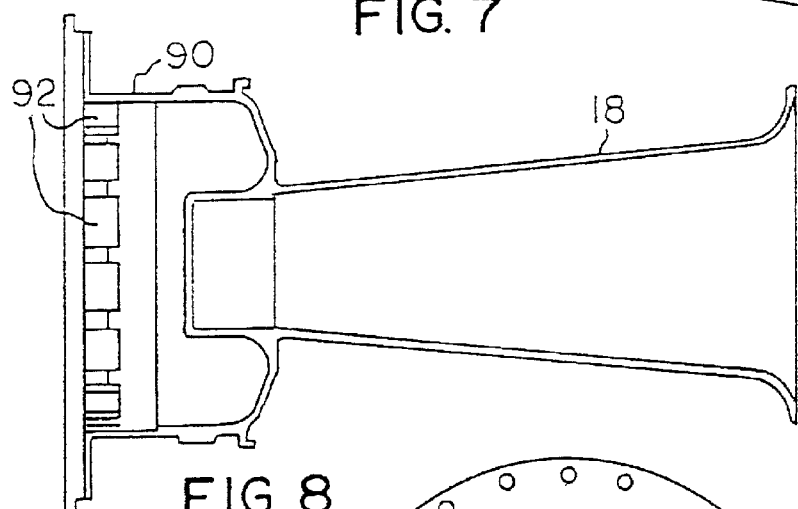
FIG. 8 is a side view of a turbine section of the turbine engine shown in FIG. 1, with the turbine section having a hot gas bypass.
Figure 9:
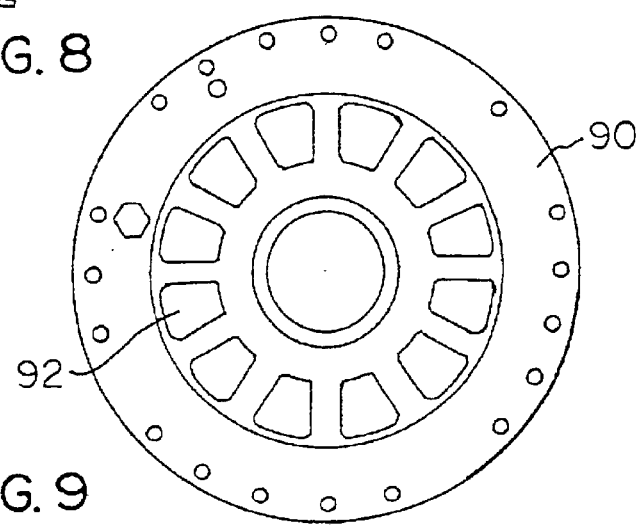
FIG. 9 is an axial end view of the hot gas bypass shown in FIG. 8.

FIGS. 8 and 9 show a hot gas bypass 90 that may be provided at the turbine exhaust 24 to block the hot air 26 from entering the recuperator 10 and to direct the hot air 26 directly to the engine exhaust 54. The hot gas bypass 90 includes a plurality of individual dampers 92 that may be hydraulically or pneumatically operated between an open position in which the hot air 26 is directed to the recuperator 10 and a closed position in which the hot air 26 is directed to the engine exhaust 54. The hot gas bypass 90 is primarily used when the recuperator 10 is not in use or when it is necessary to control the temperature of the hot air 26 exiting the recuperator 10.

Referring again to FIGS. 1–5, operation of the recuperator 10 will now be discussed. The cold air 22 enters the engine 12 at the first axial end 28 of the engine 12 through the air intake 20 and flows into the compressor section 14. The compressor section 14 is in fluid communication with the first air inlets 42 to the recuperator 10. The first air inlets 42 channel the cold air 22 into the air inlet manifold 46. The cold air 22 flows from the air inlet manifold 46 into each of the cold air chambers 66 and, in particular, into each of the cold air tubes 72.

Simultaneously, combusted air, or the hot air 26, from the combustor 16 flows through the turbine exhaust 24 and into the recuperator inlets 50. The hot air 26 flows through the recuperator inlets 50 and into each of the hot air chambers 68 and, in particular, into each of the hot air tubes 78. The hot air 26 flows through the recuperator core 40 toward the recuperator outlets 52 through the hot air tubes 78. The cold air 22 flows in the opposite direction in the cold air tubes 72 toward the air outlet manifold 48. Thus, a biaxial or counterflow is present in the recuperator core 40 with the hot air 26 flowing in one direction and the cold air 22 flowing in the opposite direction. It will be apparent to those skilled in the art that the hot air 26 flows entirely within the hot air chambers 68 and, in particular, the longitudinally extending hot air tubes 78. Similarly, the cold air 22 flows entirely within the cold air chambers 66 and, in particular, the longitudinally extending cold air tubes 72. The serpentine plate 60 forming the cold air chambers 66 and the hot air chambers 68 also separates the cold air and hot air chambers 66, 68 and prevents leakage therebetween. Heat transfer occurs by conduction and convection between the cold air 22 in the cold air chambers 66 and the hot air 26 in the hot air chambers 68. The presence of the cold and hot air fins 70, 76 in the respective cold air and hot air chambers 66, 68 increases the thermal efficiency of the heat transfer between the hot air 26 in the hot air chambers 68 and the cold air 22 in the cold air chambers 66, as is well-known in the art.

The cold air 22 preferably enters the air inlet manifold 46 at a temperature of about 440° F. The hot air 26 preferably enters the recuperator inlets 50 at a temperature of approximately 1300° F. The heat transfer in the recuperator core 40 between the hot air 26 and the cold air 22 preferably results in the cold air 22 having a temperature of approximately 1175° F. at the air outlet manifold 48 and at the first air outlets 44. The first air outlets 44, as shown in FIGS. 1 and 2, are in fluid communication with the combustor 16. Thus, the combustor 16 receives the cold air 22 at a preheated temperature of about 1175° F. The hot air 26, after the heat transfer takes place in the recuperator core 40, preferably exits the engine exhaust 54 at about 575° F.

The inner shell 30, the outer shell 32, the end caps 34, the serpentine plate 60 and the continuous sheets 74, 80 are each preferably made of metal and, in particular, any one of the following metals: AISI 347 stainless steel or an Inconel® alloy. The hot gas bypass 90 may also be made of any of the above-listed materials.

Figure 10A:
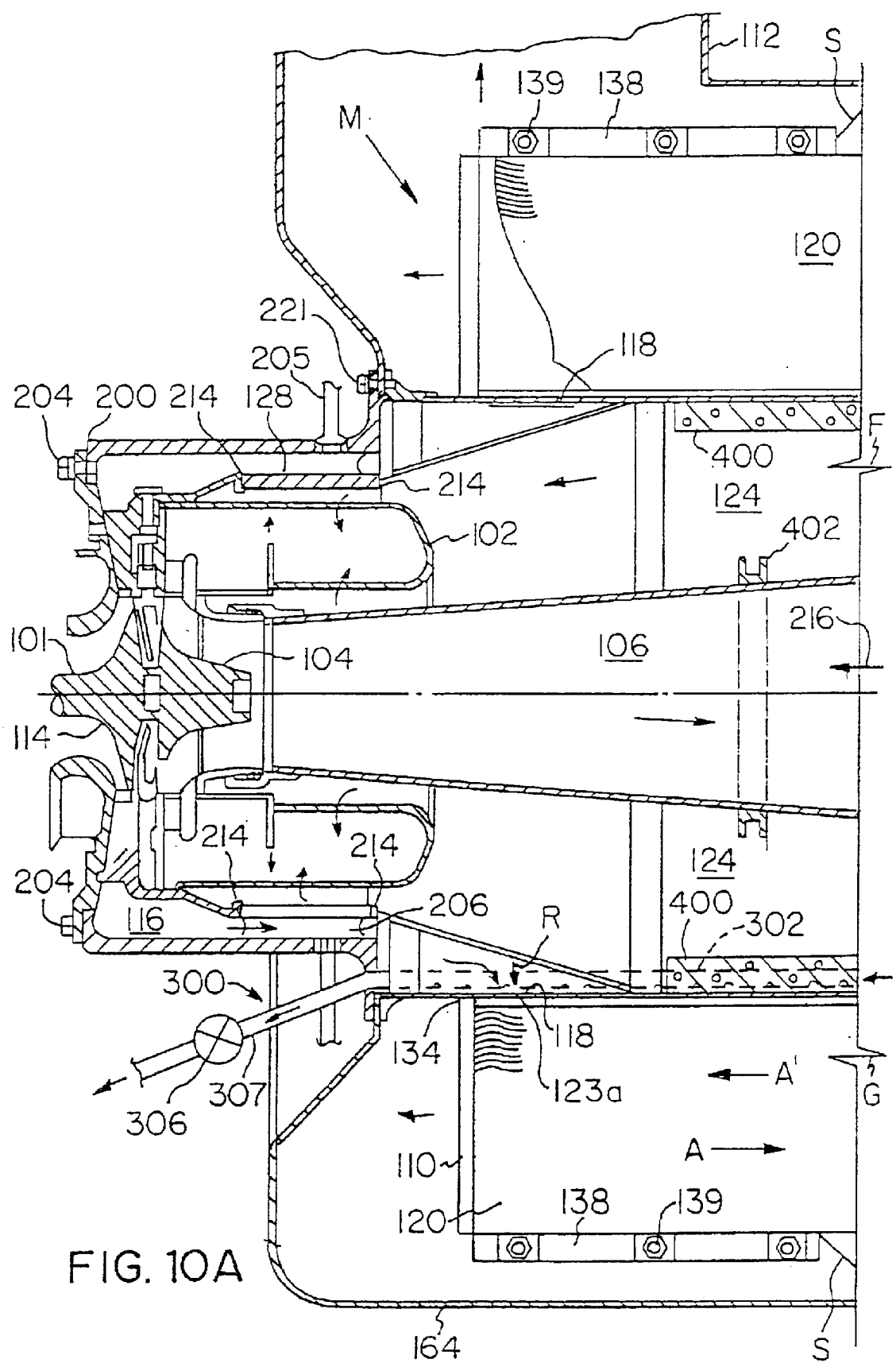
FIGS. 10a and 10b are a sectional view of a recuperator and turbine engine made in accordance with the present invention.
Figure 10B:
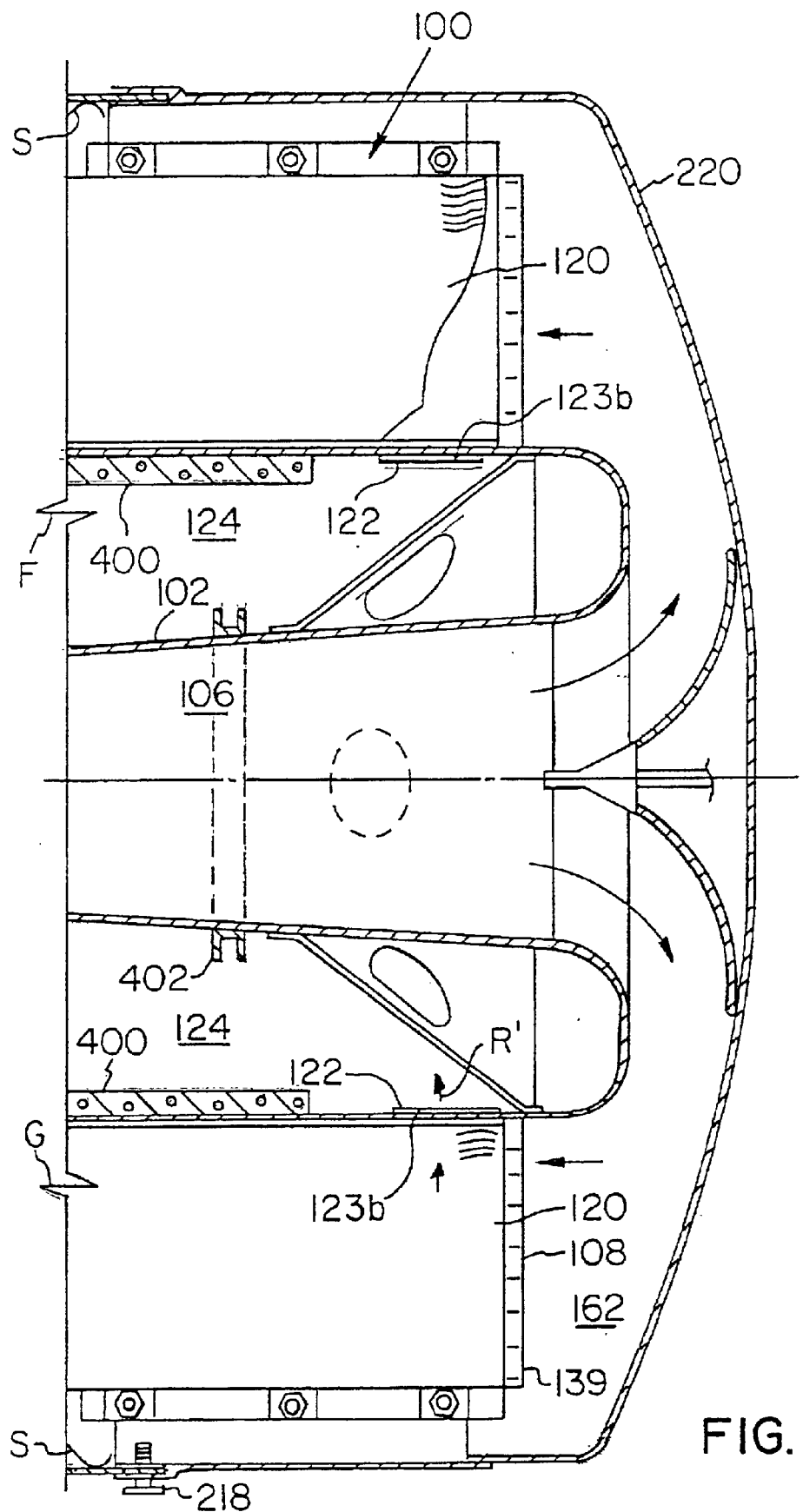

FIGS. 10a–19 show an embodiment of a recuperator 100 made in accordance with the present invention. Specifically, FIGS. 10a and 10b show the recuperator 100 in combination with a gas turbine engine 101 and include an annular combustor 102 similar to that previously described. The annular combustor 102 is in fluid communication with a turbine 104. The turbine 104 is in fluid communication with an exhaust passageway 106. The exhaust passageway 106 is in fluid communication with an annular exhaust gas inlet area 108 at one end of the recuperator 100. An exhaust gas outlet plane 110 is defined on an opposite end of the recuperator 100. The exhaust gas outlet 110 is in fluid communication with an exit 112. The general arrangement of this embodiment is similar to that as previously discussed.

The turbine 104 of engine 101 is mechanically coupled to a gas compressor 114. A mechanical seal separates gas flow from the gas compressor 114 and the turbine 104 in a manner known in the art. The gas compressor 114 is in fluid communication with an inlet passageway which is in fluid communication with either an oxygen supply or atmospheric air supply. In operation, air or oxygen is then drawn from the respective supply into the gas compressor 114 via rotation of compressor blades (not shown) driven by the turbine 104 by products of combustion (POC) driving the turbine blades. The gas compressor 114 is in fluid communication with a compressed gas passageway 116. The compressed gas passageway 116 is in fluid communication with a plurality of sealed recuperator units 120.

Specifically, the compressed gas passageway 116 is in fluid communication with a plurality of circumferentially spaced, sealed recuperator unit inlets 118 of respective sealed recuperator units 120. Respective circumferential passageways P are defined between the second recuperator units 120. Each sealed recuperator unit 120 also includes a sealed recuperator unit outlet 122 which is in fluid communication with the sealed recuperator unit inlet 118. Each of the sealed recuperator inlets 118 and sealed recuperator outlets 122 is defined by elliptical or elongate lips 123*a* and 123*b*. The sealed recuperator unit outlets 122 are in fluid communication with an annular shaped compressed gas plenum or an intermediate passageway 124, which functions as a frame, which is then in fluid communication with a compressed gas inlet to the combustor 102. A portion of the passageway 124 circumferentially surrounds an outer surface of the combustor 102. Each of the sealed recuperator units 120 is involute shaped and has the compressed air enter and leave the sealed recuperator units in radial directions R and R'. The gas then travels through the sealed recuperator unit 120 in an axial direction A. The plurality of the sealed recuperator units 120 are positioned circumferentially about the combustor 102. Each of the recuperator units 120 is curved or involute shaped.

Figure 11:
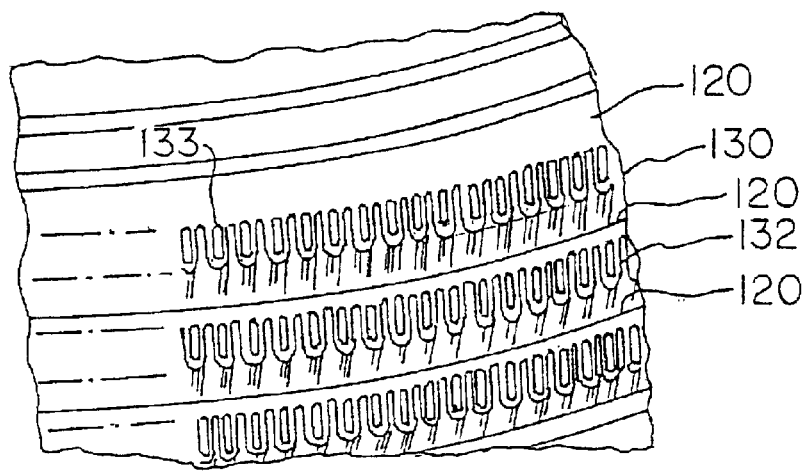
FIG. 11 is a partial perspective sectional view of a portion of the recuperator shown in FIG. 10.
Figure 12:
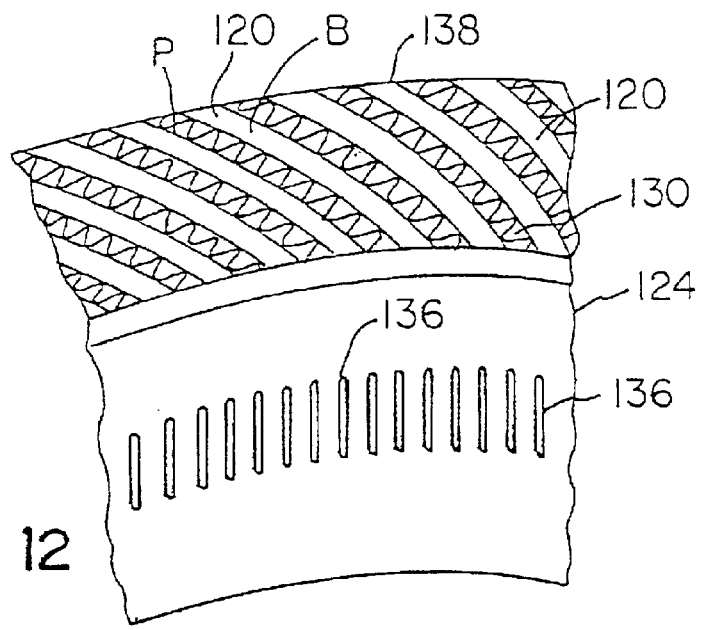
FIG. 12 is a partial top perspective view of another portion of the recuperator shown in FIG. 10.

A plurality of curved or involute shaped opened units 130, shown in FIG. 11, are positioned between respective sealed recuperator units 120 in the spaced passageways P. Each opened unit 130 is involute shaped and includes a corrugated or serpentine body 132 defining elongated passageways 133 for the POC (products of combustion) as shown in FIG. 11. The sealed recuperator units are shown in phantom in FIG. 11. Each of the sealed recuperator units 120 is secured to the annular shaped plenum 124. As shown in FIG. 12, the annular shaped plenum 124 includes a plurality of slots or passages 136. The slots 136 are in fluid communication with the compressed gas passageway 116. The slots 136 also receive respective sealed recuperator unit inlets 118. Similar slots 136 are provided and in fluid communication with the recuperator unit outlets 122. Specifically, the sealed recuperator lips 123*a* and 123*b* are welded to the plenum 124 within the respective slots 136. The sealed recuperator units 120 are fixedly held in place to the plenum 124, preferably by welding. The sealed recuperator units 118 and the opened units 130 are also held in place by a cylindrical and adjustable sleeve 138. The cylindrical and adjustable sleeve 138 compresses outer edges of the sealed recuperator units 120 and the opened units 130 so as to hold them in intimate contact with each other. The sleeves may be loosened or tightened through fastening members 139. The sleeve 138 may be removed for repair and cleaning of the sealed recuperator units 120 and the opened units 130. The sealed recuperator units 120, the opened units 130, the sleeve 138 and the plenum chamber 124 define a matrix M. An annular S-shaped seal S is attached to the sleeve 138 and prevents POC to pass between the sleeve 138 and the exhaust manifold 164. The opened units 130 are removably secured to the frame 124 by the sleeve 138. The S-shaped seal S is positioned intermediate the ends of the sleeve 138.

Figure 13:
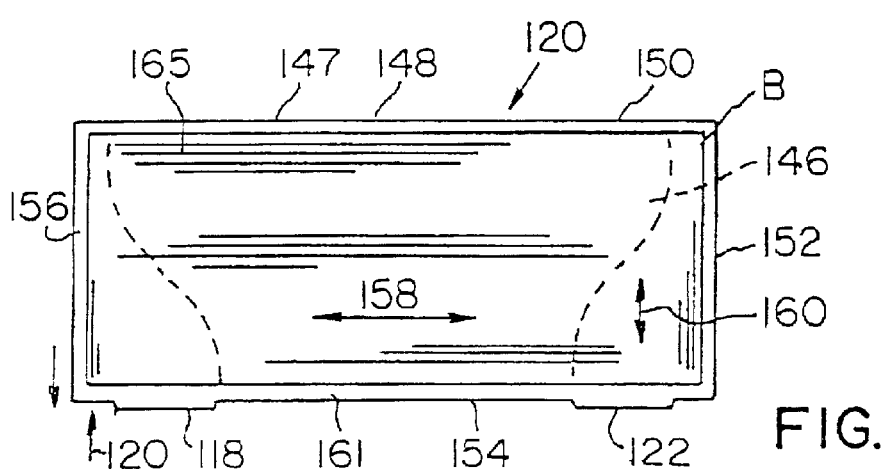
FIG. 13 is a plan view of a sealed recuperator unit made in accordance with the present invention.
Figure 14:
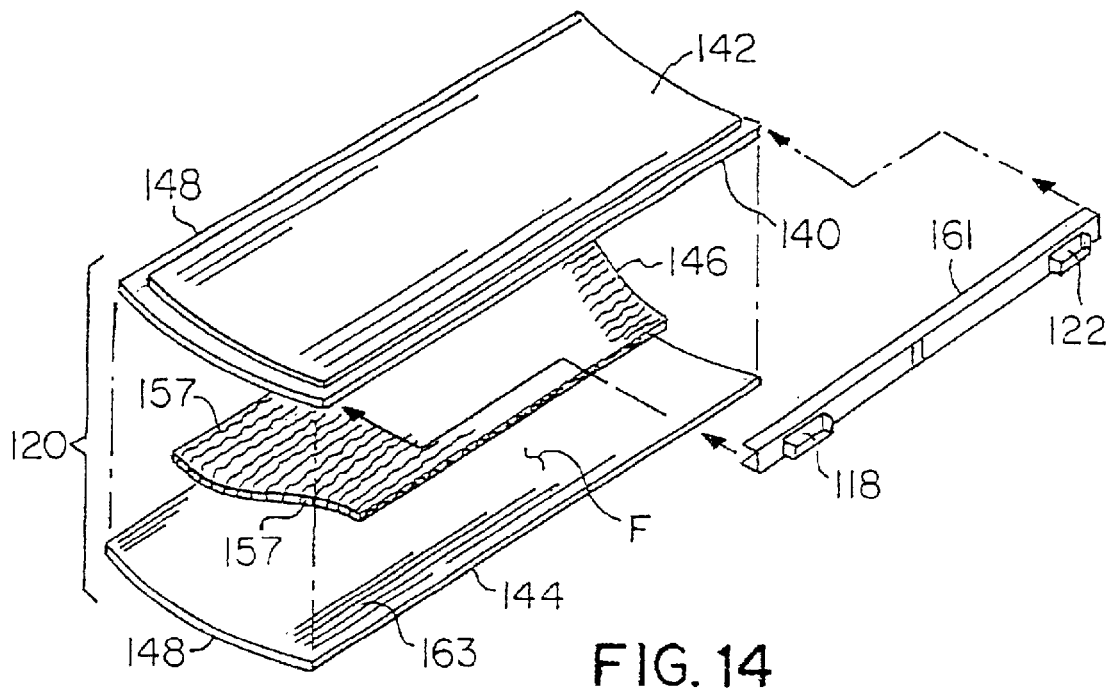
FIG. 14 is a top perspective exploded view of the sealed recuperator unit shown in FIG. 10.
Figure 15:
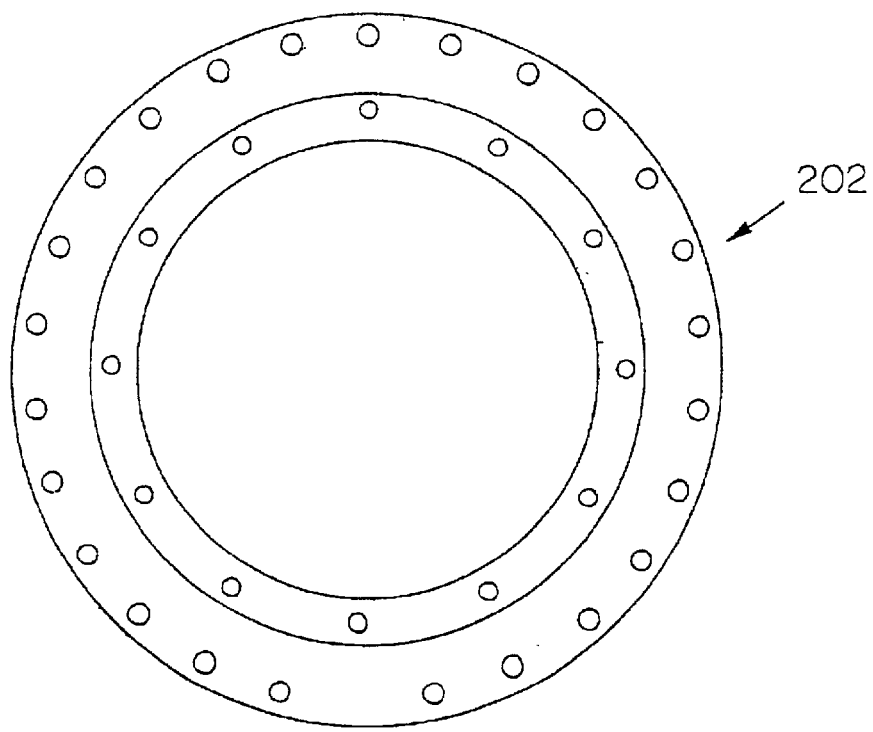
FIG. 15 is a front elevational view of the combustor housing.
Figure 16:
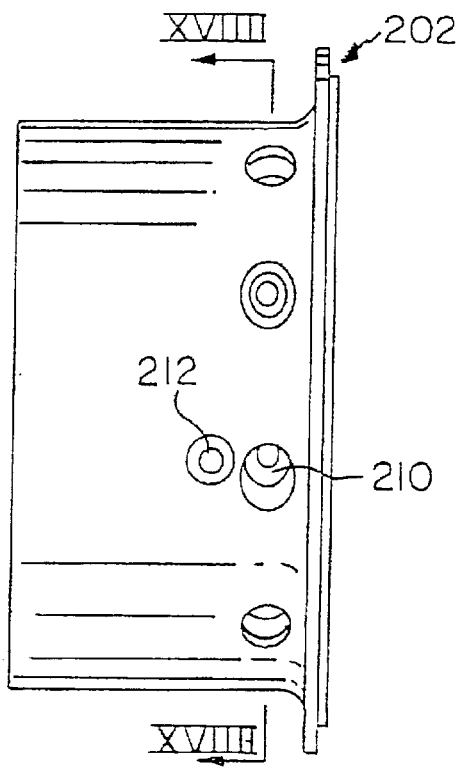
FIG. 16 is a side elevational view of the combustor housing shown in FIG. 15.
Figure 18:
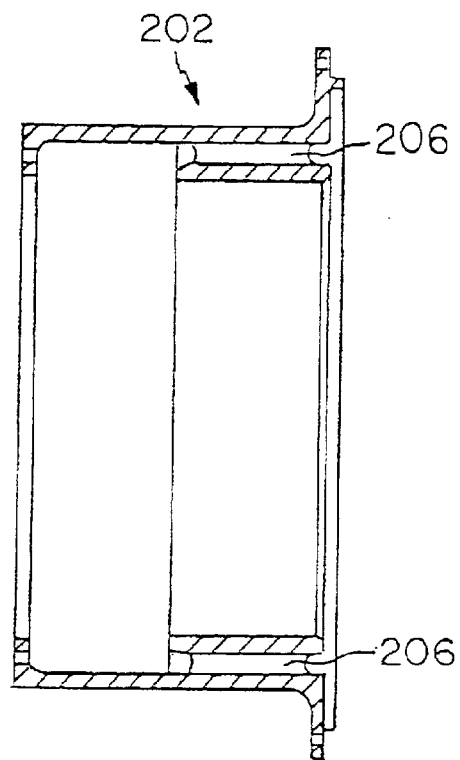
FIG. 18 is a section taken along lines 18—18 in FIG. 17.
Figure 17:
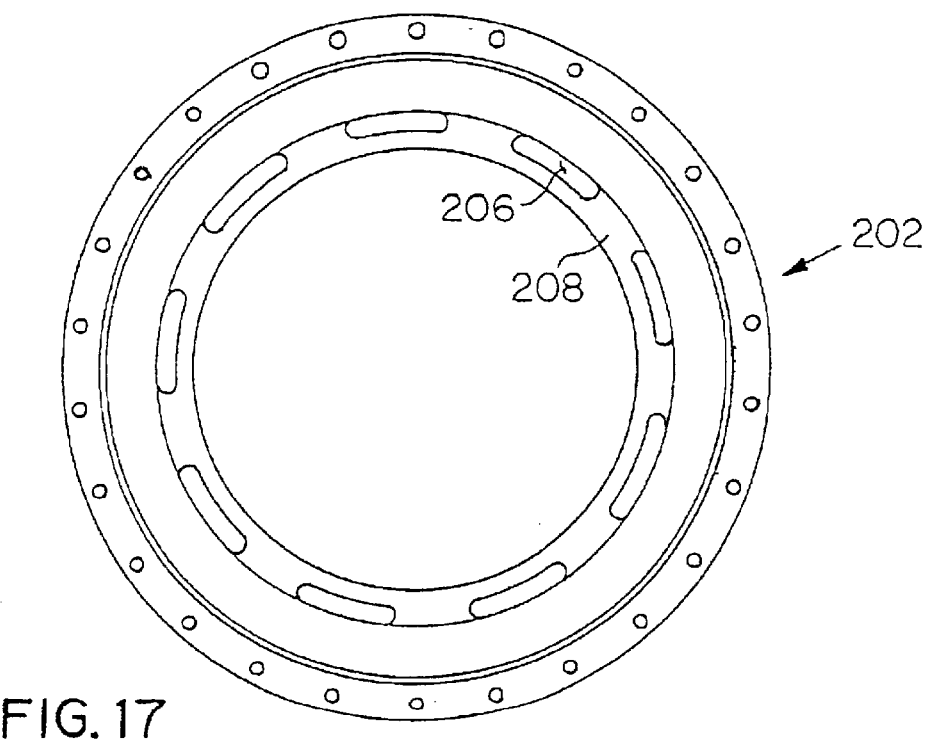
FIG. 17 is an end elevational view of the combustor housing shown in FIG. 15.
Figure 19:
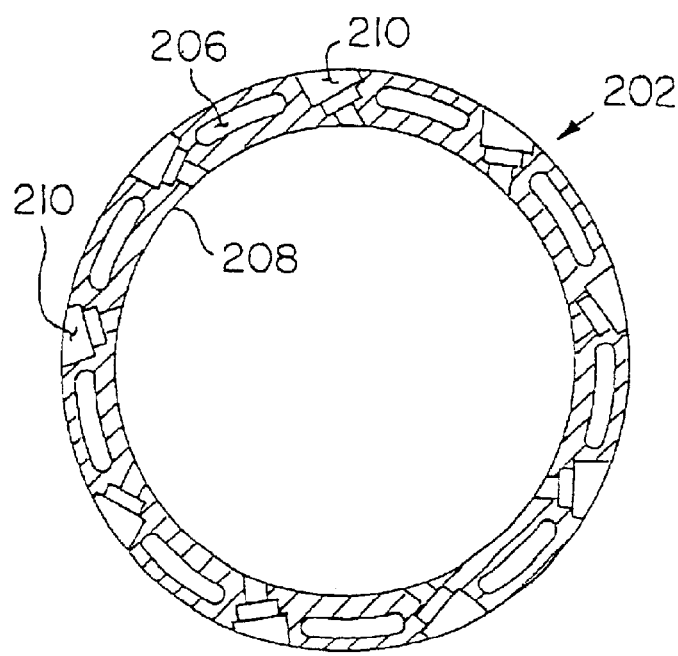
FIG. 19 is a section taken along lines 19—19 in FIG. 17.

Referring to FIGS. 13 and 14, each of the sealed recuperator units 120 includes a first involute shaped section 140 having an embossment 142 and a second involute shaped section 144. A corrugated or serpentine, involute shaped member 146 is received by the embossment 142. Member 146 is a heat transfer member. The first section 140 and the second section 144 define a body 147. Edges 148 of the first section 140 and second section 144 are bonded together by either welding or brazing so as to form the sealed unit 120 having four sides 150, 152, 154 and 156. The sealed recuperator unit inlet 118 and sealed recuperator unit outlet 122 are positioned on side 154. The corrugated member 146, known as a metal fin, is received within a flow chamber defined by inner surfaces of sections 140 and 144 which provide a plurality of elongated passageways for gas to flow from the inlet 118 to the outlet 122. The corrugated member has a plurality of apexes 157 that contact respective inner surfaces of the sections 140 and 144. Preferably, the apexes 157 are attached to the inner surfaces of sections 140 and 144 by brazing. As can be seen in FIGS. 13 and 14, the corrugated member 146 has a length 158 that varies with respect to a width 160. This arrangement is provided so that the areas positioned closest to the sealed recuperator inlet 118 and sealed recuperator outlet 122 have the largest spacing before contacting the corrugated member 146. It has been found in this arrangement an even flow of the compressed gas passes across the corrugated member 146.

A method to manufacture the sealed recuperator units 120 is as follows. The first section 140 with the embossment 142 and the second section 144 are provided. Initially, these sections are relatively flat. The corrugated member 146 is coated with a brazing material and is placed in the embossment 142. The second section 144 is placed over the first section 140. A plurality of these arrangements are stacked and sandwiched between graphite forms. The forms are weighted and the whole arrangement is placed in a furnace for a period of time. The whole arrangement is removed. This heating causes respective corrugated members 146 to be brazed or welded at their apexes to adjacent inner surfaces of the first section 140 and second section 144. Further, this causes the first section 140, second section 144 and the corrugated member 146 to have an involute or curved shape. Next, sides 150, 152 and 156 of respective first sections 140 and second sections 144 are welded together. Then, a U-shaped cross-sectional front member 161, which includes the inlet 118 and outlet 120; is slid over an end of the unwelded sides of the sections 140 and 144. Sides of the front member 161 are welded or brazed to the respective sections 140 and 144, thereby forming the inlet 118 and the outlet 122 in the sealed recuperator units 120. The sealed recuperator units include a body B having an inner surface 163 and an outer surface 165. A flow chamber F is defined by the inner surfaces 163.

Compressed gas or air, which is cooler than the POC, enters the sealed recuperator unit 120 in directions which are transverse and different to the direction of flow through the corrugated member 146. Specifically, the compressed air enters and exits the sealed recuperator unit in the substantially radial direction R and R' and passes through the corrugated member 146 in an axial direction A. The products of combustion pass through the opened units 130 in a substantially axial direction A' opposite to the flow of the compressed air as previously described. Directions A and A' are transverse to directions R and R'.

The embodiment shown in FIGS. 10*a*–14 overcomes several problems of the embodiment previously shown in FIGS. 1–9. First, the sealed recuperator units 120 can be made individually and individually quality tested. In this manner, leaks and other defects can be detected prior to assembly. Further, the complete assembled sealed recuperator units 120 are welded or brazed to the plenum 124 and can be tested to determine whether any of the sealed recuperator units 120 or their attachments leak. After the open units 130 are positioned removably between the sealed recuperator units and the sleeve 138 is tightened, this compresses in intimate contact the respective surfaces of the involute corrugated or serpentine bodies 132 against the respective outer surfaces of the involute shaped sealed recuperator units 120. Should any of the sealed recuperator units 120 or the attachments leak, they can be repaired by partial disassembly and replacement.

In operation, the compressed gas is completely separated from the products of combustion (POC) until the compressed gas enters the combustion chamber. Further, over time, the recuperator 100 can be cleaned by removing or loosening the sleeve 138 and removing the respective opened units 130. The opened units 130, which can become fouled by becoming clogged with carbon and other products of combustion, can then be cleaned by washing or replacing with different cleaned or new opened units 130.

Further, it has been found that a mechanical seal 128 can be provided to form a sealed passageway between the combustor 102 and the respective compressed gas passageway 116 and the heated compressed gas passageway 124. Another advantage of the present invention is that the combustor 102 is surrounded by either heated compressed or compressed gas since the plenum 124 circumferentially surrounds an outer surface of the combustor, thereby eliminating the necessity of providing insulating material around the exterior of the combustor housing. Hence, in operation, fuel is ignited in the combustor 102. The product of combustion (POC) then flows from the combustor 102 and drives the turbine 104, which drives the compressor 114 and an electric generator (not shown), resulting in an energy system. The POC then flows through the exhaust passageway and into the exhaust gas inlet plane 108. The POC passes through the corrugated bodies 132 of open units 130 in an axial direction A' as well as across outer surfaces of the sealed recuperator units 120. The POC exits the exhaust gas outlet plane 110 and into the atmosphere through the exit 112. Simultaneously, the compressor 114 draws in gas (either intake air or oxygen) and compresses the air. The compressed air passes through the compressed gas passageway 116 into respective sealed recuperator unit inlets 118 in a radial direction R. The compressed gas then flows through the corrugated members 146 in an axial direction A and contacts inner surfaces of the first section 140 and second section 144 of the sealed recuperator units 120. Direction A is opposite to direction A'. The compressed gas exits the sealed recuperator units 120 through sealed recuperator unit outlets 122 in a direction R'. The compressed gas then passes through the plenum 124 and enters the combustor 102 to be ignited with fuel to form POC. The POC passes heat to the compressed gas through a reverse flow direction through the sealed recuperator units 120 and the open units 130. The respective units 120 and 130 do not permit mixing of compressed gas and POC at the point of heat transfer 147. Heat transfer takes place between the POC and the compressed air or oxygen through the sealed body B of the sealed recuperator units 120. As also can be seen, the matrix assembly M, which is defined by the units 120 and 130 and the sleeve 138, is received within a volume or recuperator chamber 162 defined by the two piece, annular shaped exhaust manifold or enclosure 164 as shown in FIG. 10.

Another aspect of the present invention is the ability to repair the recuperator 100. Specifically, the recuperator 100 may be easily separated from the turbine 104 and the combustor 102. This is accomplished through the use of a combustor housing 200 and a front plate 202. The front plate 202 is secured to the combustor 102. The front plate 202 is threadably, removably secured to the combustor housing 200 through fasteners 204.

Referring to FIGS. 15–19, the combustor housing 200 is made of stainless steel and includes a plurality of spaced passageways 206 to partially define the compressed gas passageway 116. The combustor housing 200 surrounds the combustor 102. Solid sections 208 are defined adjacent the spaced passageways 206. Fuel nozzle receipt holes 210 are defined within the solid sections 208. Also, locating pin holes 212 are defined in the solid sections 208. The front plate 202 is mechanically secured to the turbine 104 and the combustor 102. Fluid seals 214 are provided adjacent opposite ends of a portion of the combustor housing 200 so that compressed air is separated in the compressed gas passageways 116 from the plenum 124. To gain access to the recuperator 100, the fastener 204 is removed and the front plate 202 is moved in an axial direction along with the combustor 102 (which is secured to the front plate 202) until it is clear of the turbine. Locating pins 205 are then removed from pin holes 212 to remove the combustor 102. The matrix M may be removed by removing fastener 221, fastener 218 and the rear shell 220. As can be seen, this arrangement enables easy repair of the combustor 102 or the matrix M.

In some instances the fuel used may be a liquid fuel, such as diesel fuel. Should an igniter fail, then the combustor and other areas, particularly the plenum 124, may have liquid fuel resting in a lowest point of the plenum chamber 124. This could result in problems. To remove this liquid fuel, a purge system 300 is provided, as shown in FIG. 10a. The purge system 300 includes a perforated tube or conduit 302 positioned in a lowest portion of the plenum chamber 124. The purge tube 302 extends from the recuperator 100 and is connected to a solenoid 306. In operation, when it is determined that liquid fuel may be pooled in the plenum chamber 124, then the compressed air passes through the compressed gas passageways 116 and then into the plenum chamber 124. The solenoid 306 is opened and a small portion of the compressed air, which is pressurized, and diesel fuel in the plenum chamber is pushed into the tube 302 through the perforations. The diesel fuel then exits the tube 302 and travels to a non-perforated conduit 307 that is external of the recuperator chamber. The tube 302 has an exit pressure at atmospheric pressure. After a period of time or after no more liquid fuel is exiting the tube 302, then the solenoid 306 is closed and no more compressed air passes through the tube 302. Then the fuel can be introduced into the combustor 102 and ignited.

Figure 21:
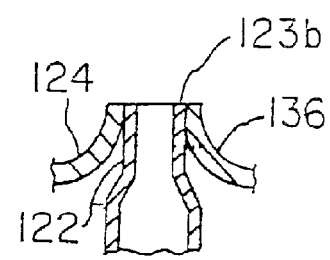
FIG. 21 is the formation of a joint.
Figure 20:
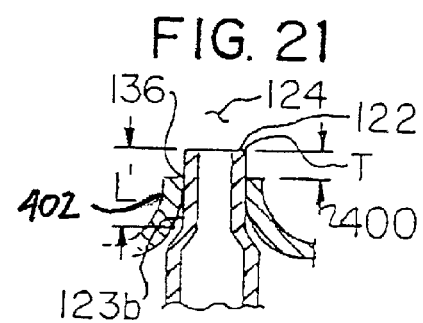
FIG. 20 is a partial sectional view prior to the formation of a joint.

Another aspect of the invention is attachment of the lips 123b of outlet 122 of the sealed recuperator units 120 to the slots 136 of the plenum chamber 124. Referring to FIG. 20, initially each outlet lip 123b is positioned in a respective slot 136. It is important to note that the length L' of the lip 123b is such that a portion 400 of a tip T extends beyond the slot 136. It is important to note that the thickness of the metal used in the lip 123b is less than the thickness of the metal used in the plenum chamber 124. For example, the metal thickness of the lip is 0.012 inch and the thickness of the plenum chamber is 0.025 inch. Then the tip T of the lip 123b is welded, for example, either by a torch or plasma arc welder to the adjacent portion of the plenum chamber 124 that defines the slot 136. This causes tip T to melt and bead and then sufficiently melt the area of the plenum 124 adjacent the slot 136 to reach a liquid or melting state so that the tip T can be welded to the plenum chamber 124, and after cooling forms a fluid tight welded joint about the lip 123*b* as shown in FIG. 21. Similarly, lip 123*a* is welded to the appropriate frame member in a similar manner as described above for lip 123*b*.

As can be seen in FIG. 20, slot 136 is defined by a lip 402.

Although the present invention has been described with reference to preferred embodiments, obvious modifications and alterations of the invention may be made without departing from the spirit and scope of the invention. The scope of the present invention is defined by the appended claims and equivalents thereto.

I claim:

1. A method for manufacturing a sealed recuperator unit comprising the steps of:
   (a) providing a first section having an embossment;
   (b) providing a second section;
   (c) placing a corrugated member in the embossment;
   (d) placing the second section over the first section; and
   (e) welding said first section to said second section thereby forming a sealed recuperator unit.

2. A method as set forth in claim 1, further comprising the steps of:
   (f) forming a fluid inlet in said sealed recuperator unit; and
   (g) forming a fluid outlet in said sealed recuperator unit.

3. A method as set forth in claim 2, further comprising the step of:
   brazing said corrugated member to said first section and said second section.

4. A method as set forth in claim 1, further comprising the step of:
   welding a front member having a fluid inlet and a fluid outlet to the first section and the second section.

5. A method as set forth in claim 1 further comprising the steps of:
   curving said first section; and
   curving said second section.

\* \* \* \* \*